C. C. ANDERSON.
ROD PACKING.
APPLICATION FILED DEC. 16, 1910.
996,446.
Patented June 27, 1911.
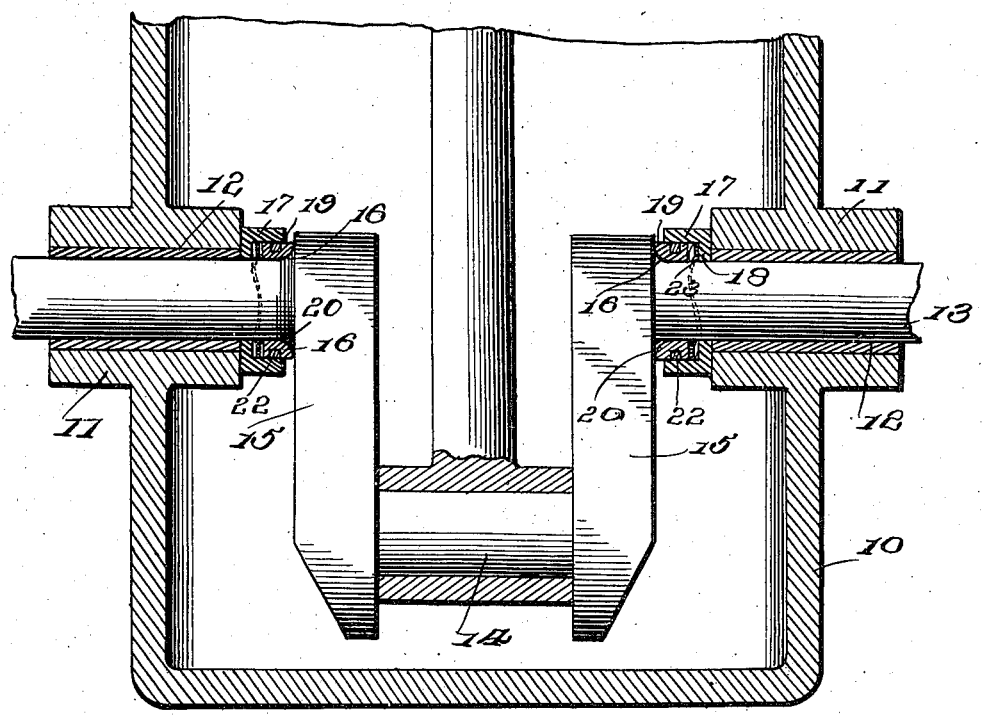
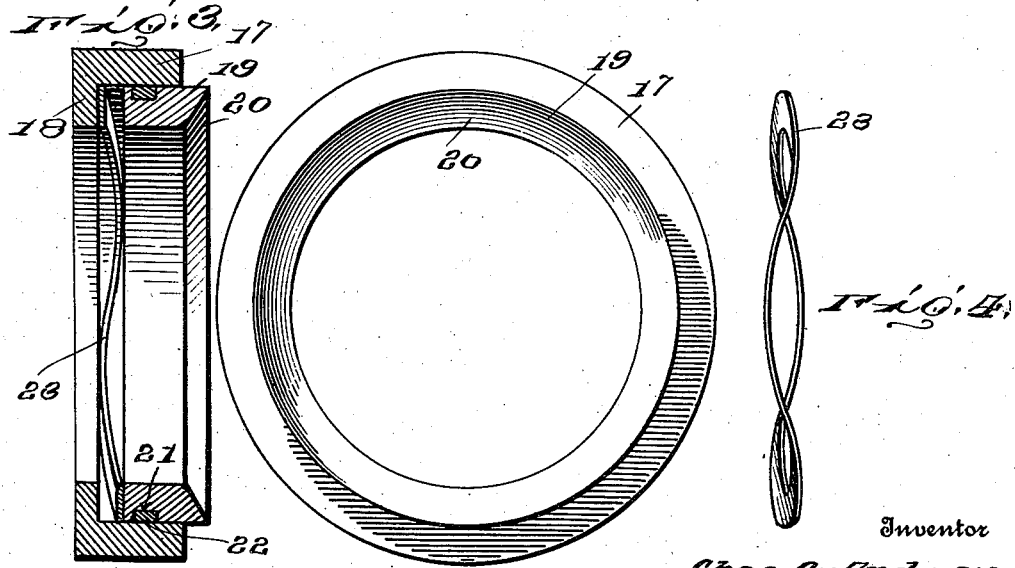
Witnesses
Inventor
Chas. C. Anderson
By Attorneys

UNITED STATES PATENT OFFICE.

CHARLES C. ANDERSON, OF ST. JOSEPH, MISSOURI, ASSIGNOR TO UHLER MOTOR CO., OF ST. JOSEPH, MISSOURI.

ROD-PACKING.

996,446.          Specification of Letters Patent.    Patented June 27, 1911.

Application filed December 16, 1910. Serial No. 597,703.

*To all whom it may concern:*

Be it known that I, CHARLES C. ANDERSON, citizen of the United States, residing at St. Joseph, in the county of Buchanan and State of Missouri, have invented certain new and useful Improvements in Rod-Packing, of which the following is a specification.

This invention relates to metallic packing for rods, shafting, and the like, and refers particularly to a simple form of metallic packing for use on crank-shafts when it is desired to seal the crank case, as in two-cycle engines, pumps of certain forms, and other such devices where a tight packing is necessary.

The invention has for an object to provide a simple metallic packing for a crank-shaft which is adapted for interposition between the offset portion of the shaft and the inner end of the bearing of the crank case, and which is of an expansible nature to bind the packing elements against the opposite faces of the crank case and the offset portion of the shaft to effectually seal the bearing and at the same time admit of a slight longitudinal movement of the crank shaft through the bearing For a full understanding of the invention reference is to be had to the following description and accompanying drawing, in which:

Figure 1 is a longitudinal sectional view through a crank-case having a shaft journaled therethrough and disclosing the improved packing applied to the same. Fig. 2 is a front elevation of the improved metallic packing enlarged. Fig. 3 is a central sectional view transversely through the packing. Fig. 4 is a detail edge view of the spring employed in connection with the packing.

Corresponding and like parts are referred to in the following description and indicated in all the views of the accompanying drawing by the same reference characters.

Referring to the drawing the numeral 10 designates a crank case which is provided at its opposite sides with bearings 11. Bushings 12 are disposed within the bearings 11 to support the opposite ends of a crank-shaft 13. The crank-shaft 13 is provided, at a point within the case 10 with an offset portion 14 supported upon the registering arms 15. Each of the arms 15 is provided with a fillet 16 at its juncture with the main portion of the crank-shaft 13. From Fig. 1 it will be observed that a space is left between the inner end of the bearing 11 and the arm 15.

The improved packing includes a cylindrical member 17 having an inturned flange 18 at one edge, the cylindrical member 17 and the flange 18 forming a small stuffing box adapted to fit snugly over the rounded portion of the crank-shaft 13. The inturned flange 18 is adapted to rest against the inner face of the bearing 11 and the bushing 12. Slidably engaging in the outer or front end of the cylindrical member 17 is a gland 19 having an inwardly beveled outer edge 20 adapted to register with and seat snugly against the fillet 16 of the crank-shaft. The gland 19 is provided with an annular groove 21 into which is fitted an expansible packing ring 22 adapted for binding engagement against the inner face of the cylindrical member 17. Within the cylindrical member 17, and disposed against the inner side of the flange 18, is a spring 23 which is in the form of a washer given longitudinal serpentine form to provide a plurality of bearing points at its opposite sides engaging alternately against the flange 18 and the inner edge of the gland 19 to yieldingly hold the gland 19 in the outer end of the stuffing box.

In the application of the metallic packing to the crank-shaft, disclosed to advantage in Fig. 1, the small stuffing box is disposed about the rounded portion of the crank-shaft 13 with the flange 18 resting against the inner ends of the bearing 11 and bushing 12. The gland 19 is forced against the fillet 16 under the tension of the spring 23 while the expansible packing ring 22 seals the passage between the gland and the stuffing box. Since the gland 19 is provided with an outer beveled edge to snugly receive the fillet 16, the bearing 11 is sealed and an air tight crank case is had.

When the crank-shaft 13 revolves, the entire packing may turn therewith or may remain stationary relative to the bearing 11, or the gland 19 may revolve within the cylindrical member 17. In all of these circumstances the spring 23 tends to expand these members and to bind the same against the inner opposite faces of the bearing 11 and the arm 15.

Having thus described the invention what is claimed as new is:—

1. Metallic packing including a cylindrical member having an inturned flange at one side providing a stuffing box, a gland fitting in the open side of the stuffing box and having a peripheral groove, an expanding packing ring carried in the groove and engaging the inner wall of the stuffing box, and a spring washer carried within the stuffing box and being interposed between the flange and the gland whereby the latter is yieldingly extended.

2. Metallic packing including a stuffing box open at one side, a slidable gland fitting in the open side of the stuffing box and having a peripheral groove, a split packing ring carried in the groove and extending against the inner wall of the stuffing box, and a serpentine spring washer carried in the stuffing box and against the gland to yieldingly extend the same.

3. Metallic packing including a stuffing box for engagement about a crank shaft, a gland fitting in one side of the stuffing box and having a rounded outer edge receiving the fillet of the crank shaft and being provided with a peripheral groove, a packing ring carried in the groove and engaging against the stuffing box to seal the gland therein, and a serpentine spring washer disposed in the inner end of the stuffing box and engaging against the gland to yieldingly bind the same against the fillet.

In testimony whereof, I affix my signature in presence of two witnesses.

CHARLES C. ANDERSON. [L. S.]

Witnesses:
LEWIS SEIGEL,
HERBERT R. LEWIS.